(12) United States Patent
Delpier et al.

(10) Patent No.: US 9,645,614 B2
(45) Date of Patent: May 9, 2017

(54) TABLET ATTACHMENT SYSTEM

(71) Applicant: Hewlett-Packard Development Company, L.P., Houston, TX (US)

(72) Inventors: Michael J Delpier, Houston, TX (US); Stacy L Wolff, Houston, TX (US); Kevin L Massaro, Houston, TX (US); Dimitre D Mehandjiysky, Houston, TX (US); Aki Laine, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/765,322

(22) PCT Filed: Jan. 31, 2013

(86) PCT No.: PCT/US2013/023995
§ 371 (c)(1),
(2) Date: Jul. 31, 2015

(87) PCT Pub. No.: WO2014/120171
PCT Pub. Date: Aug. 7, 2014

(65) Prior Publication Data
US 2016/0004279 A1    Jan. 7, 2016

(51) Int. Cl.
*G06F 1/16* (2006.01)
*G06F 1/18* (2006.01)

(52) U.S. Cl.
CPC .......... *G06F 1/1656* (2013.01); *G06F 1/1632* (2013.01); *G06F 1/1637* (2013.01); *G06F 1/1654* (2013.01); *G06F 1/189* (2013.01)

(58) Field of Classification Search
CPC combination set(s) only.
See application file for complete search history.

(56) References Cited

U.S. PATENT DOCUMENTS

| | | | |
|---|---|---|---|
| 5,100,098 A * | 3/1992 | Hawkins | F16M 11/041 16/339 |
| 5,481,430 A | 1/1996 | Miyagawa et al. | |
| 7,652,873 B2 * | 1/2010 | Lee | E05B 65/006 248/917 |
| 7,724,533 B2 * | 5/2010 | Tanaka | G06F 1/1616 361/752 |
| 7,873,771 B2 | 1/2011 | Krueger et al. | |

(Continued)

FOREIGN PATENT DOCUMENTS

WO    WO-2012/127118 A1    9/2012

OTHER PUBLICATIONS

"NEC Outs Lavie Touch Windows Tablet with Cool Add-ons Included," Sep. 12, 2011, pp. 1-5, gogadgetnews.com.

(Continued)

*Primary Examiner* — Lisa Lea Edmonds
(74) *Attorney, Agent, or Firm* — Rathe Lindenbaum LLP (57) ABSTRACT

A display mounting system comprises a display (20, 120, 420, 720) having a perimeter edge surrounding a front face (30, 730) comprising a display region (34, 734) and a rear face (32, 732). An opening (26, 126, 426, 726) extends into the front face (30, 730) and is spaced from the perimeter edge of the display (20, 120, 420, 720) to receive and facilitate mounting of a display support accessory (44, 144, 244, 344, 345, 444, 544, 744, 844, 944, 1044, 1144, 1244).

10 Claims, 10 Drawing Sheets

(56) References Cited

U.S. PATENT DOCUMENTS

| | | | | |
|---|---|---|---|---|
| 8,208,245 B2* | 6/2012 | Staats | .................... | G06F 1/162 |
| | | | | 361/679.02 |
| 8,498,100 B1* | 7/2013 | Whitt, III | .............. | G06F 1/1618 |
| | | | | 361/679.17 |
| 8,625,272 B2* | 1/2014 | Huang | .................. | G06F 1/1656 |
| | | | | 361/679.41 |
| 9,007,761 B2* | 4/2015 | Wolff | .................... | G06F 1/1632 |
| | | | | 361/679.43 |
| 2006/0077622 A1 | 4/2006 | Keely et al. | | |
| 2006/0285284 A1 | 12/2006 | Tracy et al. | | |
| 2007/0103442 A1 | 5/2007 | Pappas | | |
| 2012/0194448 A1 | 8/2012 | Rothkopf | | |
| 2012/0218699 A1* | 8/2012 | Leung | .................. | G06F 1/1616 |
| | | | | 361/679.08 |
| 2014/0184904 A1* | 7/2014 | Lam | ...................... | G06F 1/1616 |
| | | | | 348/375 |

OTHER PUBLICATIONS

International Search Report and Written Opinion, International Application No. PCT/US2013/023995, Date of Mailing: Oct. 29, 2013, pp. 1-7.

Loyd Case, "Why Windows 8 Hybrids Won't Survive the Test of History," Sep. 10, 2012, pp. 1-8, PCWorld.

Melanie Pinola, "New Windows 8-ready Hybrid Tablet, Convertible Laptop From Fujitsu," Jul. 9, 2012, pp. 1-6, PCWorld Communications, Inc.

* cited by examiner

TABLET ATTACHMENT SYSTEM

BACKGROUND

Displays, such as computing tablets, are sometimes mounted to other accessories such as keyboard decks. Over time, such displays have become thinner and thinner with technological advances. As a result, such thinner displays occupy less volume and are easier to carry and use.

DETAILED DESCRIPTION OF THE EXAMPLE EMBODIMENTS

Figure 1:
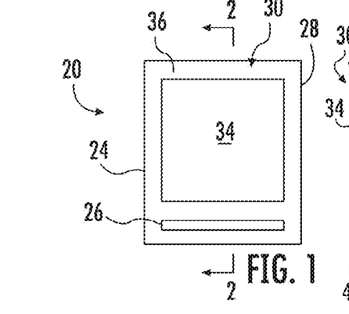
FIG. 1 is a front view of an example display.
Figures 2, 3:
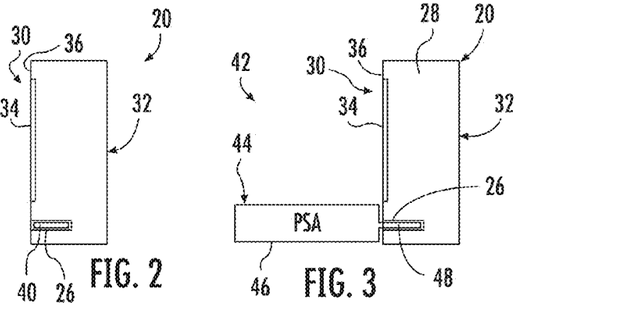
FIG. 2 is a side sectional view of the display of FIG. 1 taken along line 2-2.
FIG. 3 is a side sectional view of the display of FIG. 2 as part of an example display mounting system.

FIGS. 1 and 2 illustrate an example display 20 for use as part of a tablet mounting system. For purposes of illustration, the thickness of display 20 is exaggerated. The increasing thinness of recent displays has made mounting of the displays to such accessories difficult. With such thin displays, existing mounting technology may not adequately support the display. Alternatively, existing mounting technology may result in the displays being thicker and more cumbersome. As will be described hereafter, display 20 facilitates sturdy and reliable mounting of display 20 to a panel supporting assembly.

Display 20 comprises panel 24 and opening 26. Panel 24 comprises a substantially planar panel having a perimeter edge 28 surrounding a front face 30 and a rear face 32. Front face 30 comprises a display region 34. In one implementation, display region 34 comprise a touch screen presenting graphical user interfaces or icons which are selected by a person touching selected portions of display region 34. In other implementations, display region 34 may receive input using other input devices such as a mouse, touchpad, keyboard and the like. In the example illustrated, front face 30 forms a bezel or frame 36 surrounding display region 34. In other implementations, display region 34 may extend substantially across all of front face 30 but for opening 26.

In one implementation, display 20 includes an internal processing device and an internal memory, wherein display 20 serves as a computing tablet. In another implementation, display 20 may utilize a processing device or memory (a source for programming or a source for data) from a remote device or a remote location. For example, in one implementation, display 20 may communicate with a remote location which includes a processing device and/or memory for at least partially controlling or effecting the operation of display 20. In yet another implementation, display 20 may be mounted to a panel support accessory, wherein the panel support accessory comprises a processing device or a memory for at least partially controlling or effecting the operation of display 20. In some implementations, display 20 may be mounted to a panel support accessory which itself is in communication with an external processing unit and/or memory for at least controlling or affecting the operation of display 20.

Opening 26 comprises an aperture, pocket, void, receptacle or slot extending into front face 30. Opening 26 is spaced from perimeter edge 28 of display 20. Opening 26 is configured to receive a panel support accessory to facilitate mounting of the panel support accessory to display 20. Examples of different panel supporting assemblies that may be releasably mounted to display 20 using opening 26 include, but are not limited to, a keyboard deck, a power/ charge dock, a supporting stand or folio, a keyboard jacket, a battery, a media or connection dock and a wall mount.

As shown by FIG. 2, in the example illustrated, opening 26 extends into front face 30 and terminates prior to reaching rear face 36. As will be described hereafter, in other implementations, opening 26 may extend completely through panel 24, facilitating reception of a panel support accessory from either the front face 30 or the rear face 36 of display 20.

As further shown by 2, when opening 26 is utilized independent of any panel support accessory, display 20 may additionally comprise a plug 40 received within opening 26. In one implementation, plug 40 extends substantially flush with front face 30. In another implementation, plug 40 may project from front face 30 or may be partially indented within front face 30. In one implementation, plug 40 may include an internal battery for supplying power to display 20, may serve as an antenna or other device for facilitating wireless communication for display 20, may include a memory or other persistent storage device for use by display 20 or may serve other auxiliary functions for display 20.

FIG. 3 illustrates tablet mounting system 42 comprising display 20 of FIG. 2 and panel support accessory 44. As shown by FIG. 3, panel support accessory 44 comprises a device that is releasably attached to display 20 using opening 26. Panel support accessory 44 comprises panel support portion 46 and projection 48. Panel support portion 46 rests upon, abuts against or engages the surrounding environment of display 20 to assist in supporting display 20 in a vertical or inclined orientation with respect to a vertical surface or horizontal surface adjacent to display 20. Panel support portion 46 may additionally provide auxiliary functions or serve auxiliary purposes for display 20. As noted above, panel support portion 46 may serve as an auxiliary keyboard or keypad, may serve as an auxiliary touchpad or touchscreen, may serve as an auxiliary battery or may serve as an auxiliary media dock.

Projection 48 projects from the panel supporting portion 46 and is removably received within opening 26. In one implementation, projection 48 rigidly and immovably extends from panel supporting portion 46. In another implementation, projection 48 is pivotably coupled to panel support portion 46 for pivotal movement about a horizontal axis to adjust the verticality or tilted orientation at which display 20 is supported. Projection 48 has outer surfaces that abut, engage or contact the internal or interior surfaces of opening 26 to reliably secure panel support accessory to display 20. In one implementation, projection 48 may include contacts, antennas, retainers, latches and the like along its outer surfaces or other structures that facilitate the retention of display 20, that facilitate the transition of power between display 20 and panel support accessory 44 or that facilitate the communication of data between display 20 and panel support accessory 44.

Figure 4:
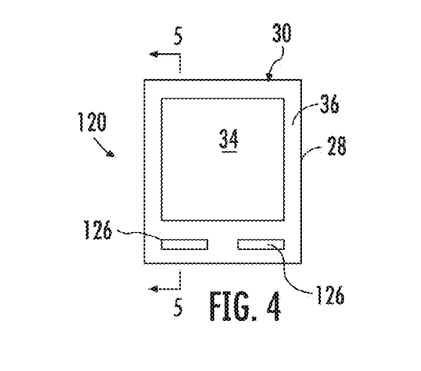
FIG. 4 is a front view of another example display.

FIG. 4 illustrates display 120, another example implementation of display 20. Display 120 is similar to display 20 except that display 120 comprises a plurality of spaced openings 126 in lieu of opening 26. Those components of display 120 which correspond to components of display 20 are numbered similarly. Openings 126 extend into front face 30 and are spaced from the perimeter edge 28 of panel 30. Openings 126 are configured to receive and facilitate mounting of a panel support accessory. Although display 120 is illustrated as including two symmetrically located and equally sized openings 126, in other implementations, display 120 may include greater than two openings 126 and such openings in 126 may have different sizes, shapes or configurations as compared to one another.

Figure 5:
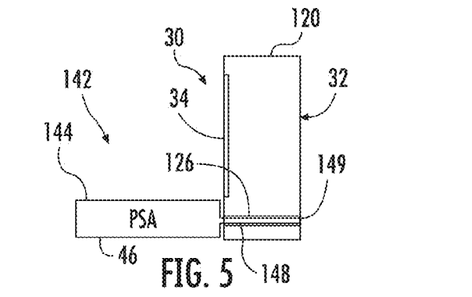
FIG. 5 is a side sectional view of the display of FIG. 4 taken along line 5-5 and provided as part of another example display mounting system.

FIG. 5 illustrates display mounting system 142, another implementation of display mounting system 42. Display mounting system 142 comprises display 120 and panel support accessory 144. FIG. 5 illustrates a sectional view of display 120 taken along line 5-5, wherein each of openings 126 extends completely through display 120, extending from front face 30 to rear face 32. As a result, openings 126 may engage and interact with panel support accessory 144 along the entire thickness of display 120 to facilitate greater contact and greater mechanical support or leverage for the support of display 120 in a vertical or inclined orientation.

Panel support accessory 144 is similar to panel support accessory 44 except that panel support accessory 144 comprises projection 148 extending from panel support portion 46. In one implementation, projection 148 rigidly and immovably extends from panel supporting portion 46. In another implementation, projection 148 is pivotably coupled to panel support portion 46 for pivotal movement about a horizontal axis to adjust the verticality or tilted orientation of display 120.

Projection 148 has a length so as to extend across or through the entire thickness of display 120. In one implementation, projection 148 terminates at an end face 149 that is flush with rear face 32 of display 120. In another implementation, projection 148 may extend beyond rear face 32 or may terminate within opening 126. As with projection 48, projection 148 has outer surfaces that abut, engage or contact the internal or interior surfaces of opening 126 to reliably secure panel support accessory to display 120. In one implementation, the outer profile of projection 148 matches the outer profile of opening 126 for mating interaction for enhanced retention. In one implementation, projection 148 may include contacts, antennas, retainers, latches and the like along its outer surfaces or other structures that facilitate the retention of display 120, that facilitate the transmission of power between display 120 and panel support accessory 144 or that facilitate the communication of data or control signals between display 120 and panel support accessory 144.

Figure 6:
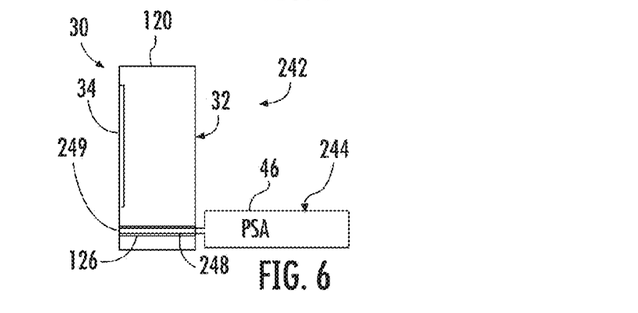
FIG. 6 is a side sectional view of the display of FIG. 4 taken along line 5-5 and provided as part of another example display mounting system.

FIG. 6 illustrates display mounting system 242, an alternative implementation of display mounting system 142. Display mounting system 242 is similar to display mounting system 142 except that display mounting system 242 includes panel support accessory 244 in lieu of panel support accessory 144. Panel support accessory 244 is similar to panel support accessory 144 except that panel support accessory 244 extends along and from rear face 32 of display 120 into display 120 and includes projection 248 in lieu of projections 148. In particular, panel support accessory 244 comprises panel support portion 46 and projection 248. Projection 248 is similar to projection 148 except that projection 248 extends from panel support portion 46 into openings 126 of display 120 from the rear face 32. In one implementation, projection 248 rigidly and immovably extends from panel supporting portion 46. In another implementation, projection 248 is pivotably coupled to panel support portion 46 for pivotal movement about a horizontal axis to adjust the verticality or tilted orientation of display 20. Projection 248 has a terminal end 249 that is flush with front face 30 of display 120. In another implementation, projection 248 may extend beyond rear face 32 or may terminate within opening 126. As with projection 48, projection 248 has outer surfaces that abut, engage or contact the internal or interior surfaces of opening 126 to reliably secure panel support accessory to display 120. In one implementation, projection 248 may include contacts, antennas, retainers, latches and the like along its outer surfaces or other structures that facilitate the retention of display 120, that facilitate the transition of power between display 120 and panel support accessory 144 or that facilitate the communication of data between display 120 and panel support accessory 244. In such implementations, the contacts antennas, retainers, latches and the like along the outer surface of projection 248 may be at different locations as compared to projection 248 to accommodate the rear connection of accessory 144.

Figure 7:
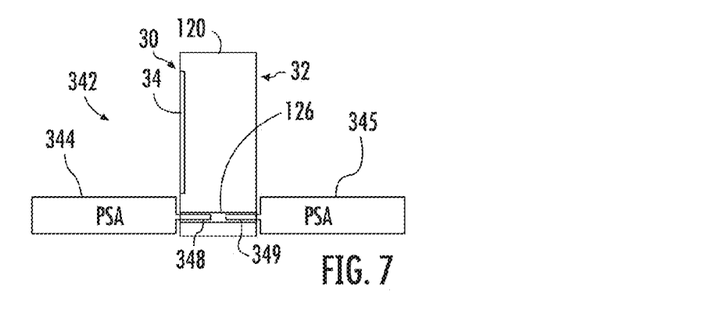
FIG. 7 is a side sectional view of the display of FIG. 4 take along line 5-5 and provided as part of another example display mounting system.

FIG. 7 illustrates display mounting system 342, another implementation of systems 142 and 242. Display mounting system 342 comprises display 120, panel support accessory 344 and panel support accessory 345. Panel supporting accessories 344 and 345 are similar to panel supporting accessories 144 and 244, respectively, except that accessories 344, 345 comprise projections 348, 349 in place of projections 148 and 248, respectively. Projection 348 is similar to projection 148 except that projection 348 extends partway through opening 126. Likewise, projection 349 is similar to projection 248 except that projection 349 extends partway through opening 126, allowing projections 348 and 349 to share the interior of opening 126 of display 120. As shown by FIG. 7, opening 126 facilitates mounting panel supporting accessories to both sides of display 120. As with projection 148, each of projections 348 and 349 has outer surfaces that abut, engage or contact the internal or interior surfaces of opening 126 to reliably secure panel support accessory to display 120. In one implementation, projection 348, 349 may include contacts, antennas, retainers, latches and the like along its outer surfaces or other structures that facilitate the retention of display 120, that facilitate the transition of power between display 120 and panel supporting accessories 344, 345, respectively or that facilitate the communication of data between display 120 and panel supporting accessories 344, 345, respectively.

Figure 8:
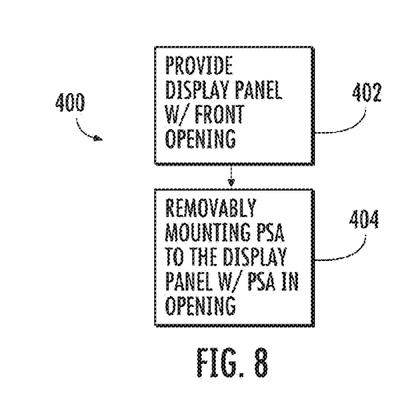
FIG. 8 is a flow diagram of an example method that may carried out with the display mounting systems of FIGS. 3 and 5-7.

FIG. 8 is a flow diagram of an example method 400 that may be implemented using any of display mounting systems 42, 142, 242 and 342. As indicated by step 402, a display (20 or 120) is provided, wherein the display has an opening (26, 126) extending into a front face of the display face from an edge of the display. As indicated by step 404, a display support accessory is removably mounted to the display with a portion of the panel support accessory within the opening.

Figure 9:
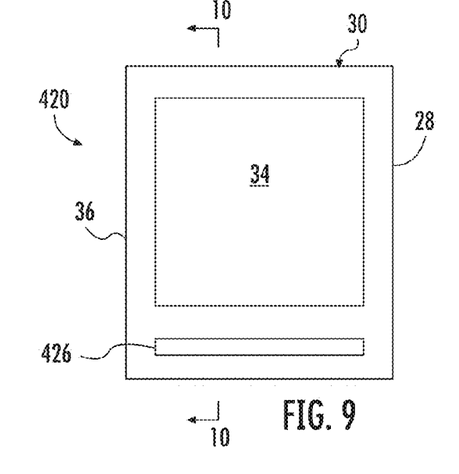
FIG. 9 is a front view of another example display.
Figure 10:
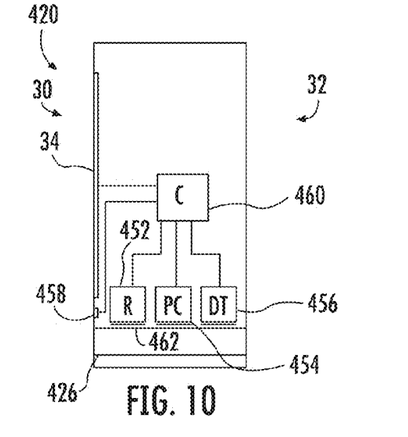
FIG. 10 is a side sectional view of the display of FIG. 9 taken along line 10-10.

FIGS. 9 and 10 illustrate display 420, an example implementation of displays 20 and 120. Display 420 is similar to display 120 except that display 420 comprises opening 426 in lieu of openings 126 and further comprises retainer 452, power connection 454, data transceiver 456, indicator 458 and controller 460 (each of which is schematically shown). The remaining components of display 420 which correspond to components of display 120 are numbered similarly.

Opening 426 is similar to opening 126 except that opening 426 comprises a single opening which is specifically illustrated as including each of retainer 452, power connection 454 and data transceiver 456 along its interior surface 462. In other implementations, opening 426 may comprise a plurality of such openings.

Retainer 452 comprises a mechanism configured to interact with or cooperate with a projection of a panel support accessory to releasably secure and retain the projection within and with respect to opening 426 and display 420. In one implementation, retainer 452 may comprise a mechanical latch which is actuated between a locking state and an unlocked state either manually (through a pushbutton, lever or other manual engagement mechanism on the exterior of display 420) or under power of an actuator such as electric solenoid. In another implementation, retainer 452 may be part of a magnetic latch which, in response to power control signal from controller 460, magnetically interacts with a projection to retain the projection in place or to release the projection.

Power connection 454 comprises a device by which power may be transmitted to display 420 from a projection received within opening 426. In one implementation, power connection 454 may comprise an electric conductive contact pad or an electric conductive surface along the interior 462 of opening 426. In another implementation, power connection 454 may comprise components to facilitate non-contact power transmission, such as inductive power transmission, from a projection received within opening 426 to display 420. In some implementations, power connection 454 may alternatively or additionally be configured to facilitate the transmission of power from display 420 to a projection of a panel support accessory received within opening 426. In such a manner, display 420 (and its internal battery) may supply power to an accessory connected to display 420.

Data transceiver 454 comprises a device by which data or control signals may be transmitted and received to and from the projection of an attached panel support accessory. In one implementation, data transceiver 454 comprises one or more electrically conductive surfaces or contact pads along the interior 462 of opening 426 to facilitate a contact based or wired transmission. In another implementation, data transceiver 454 may comprise an antenna or other mechanism to facilitate wireless communication between display 420 and a projection of a panel support accessory received within opening 426.

Indicator 458 comprises a device to visibly indicate to a person when one or more of retainer 452, power connection 454 or data transceiver 456 is engaged, connected or communicating with a projection received within opening 426. For example, in one implementation, indicator 458 may comprise light emitting diodes or other light emitting indicators that inform a person when projection 426 is locked or unlocked with respect to display 420 by retainer 452. Indicator 458 may visibly indicate when projection 426 is appropriately positioned within opening 426 to facilitate power transmission between power connection 454 of display 420 and a projection received within opening 426. Indicator 458 may visibly indicate when data are control signals are being transmitted between data transceiver 456 of display 420 and a projection received within opening 426. In other implementations, indicator 458 may indicate the state of additional connections between projection received within opening 426 and display 420, may indicate less than all of the states of retainer 452, power connection 454 and data transceiver 456 or may be omitted.

Controller 460 comprises one or more processing units configured to generate control signals directing operation of display region 34. Controller 460 is further connected to each of retainer 452, power connection 454, data transceiver 456 and indicator 458. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 460 may be embodied as part of one or more application-specific integrated circuits (ASICs). Unless otherwise specifically noted, the controller is not limited to any specific combination of hardware circuitry and software, nor to any particular source for the instructions executed by the processing unit.

In one implementation, controller 460 generates control signals to actuate retainer 452 between locked and unlocked states. In one implementation, controller 460 controls the transmission or receipt of power through power connection 454. In one implementation, controller 460 controls the transmission or receipt of data or control signals through data transceiver 456. In some implementations, one or more of retainer 452, power connection 454 and data transceiver 456 may alternatively be omitted.

Figure 11:
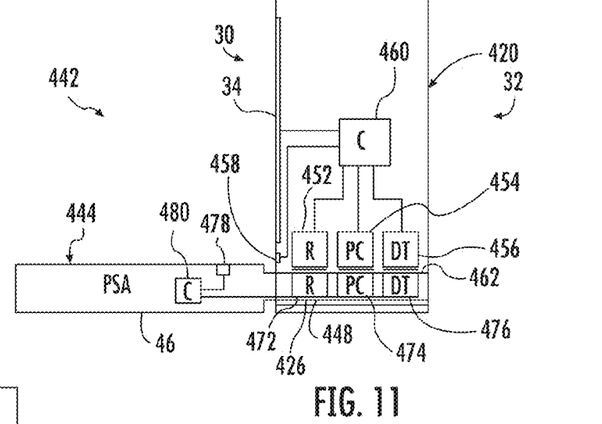
FIG. 11 is a side sectional view of the display of FIG. 9 taken along line 10-10 and provided as part of another example display mounting system.

FIG. 11 illustrates panel mounting system 442, an implementation of panel mounting systems 42 and 142. Panel mounting system 442 comprises display 420 and panel supporting accessory 444. Panel support accessory 444 is similar to panel support accessory 144 except that panel support accessory 444 comprises projection 448 in lieu of projection 148. Panel support accessory 444 further comprises indicator 478 and controller 480.

Projection 448 is similar to projection 148 except that projection 448 is illustrated as specifically comprising accessory retainer 472, accessory power connection 474, accessory data transceiver 476 accessory indicator 478 and controller 480. In one implementation, projection 448 rigidly and immovably extends from panel supporting portion 46. In another implementation, projection 448 is pivotably coupled to panel support portion 46 for pivotal movement about a horizontal axis to adjust the verticality or tilted orientation of display 420.

Retainer 472 comprises a mechanism configured to interact with or cooperate with retainer 452 of display 420 to releasably secure and retain the projection 448 within and with respect to opening 426 and display 420. In one implementation, retainer 472 may comprise a mechanical latch which is actuated between a locking state and an unlocked state either manually (through a pushbutton, lever or other manual engagement mechanism on the exterior of display 420 or on the exterior of the panel support accessory 444) or under power of an actuator such as electric solenoid. In another implementation, retainer 472 may be part of a magnetic latch which, in response to power control signal from controller 460 (or a controller of the panel support accessory 444), magnetically interacts with a projection to retain projection 448 in place or to release the projection 448 respect to display 420.

Power connection 474 comprises a device by which power may be transmitted to display 420 from projection 448 received within opening 426. In one implementation, power connection 474 may comprise an electrically conductive contact pad or an electrically conductive surface along an exterior surface of projection 448. In another implementation, power connection 474 may comprise components to facilitate non-contact power transmission, such as inductive power transmission, from projection 448 received within opening 426 to display 420. In some implementations, power connection 474 may alternatively or additionally be configured to facilitate the transmission of power from display 420 to projection 448 of a panel support accessory 444 when received within opening 426. In such a manner, display 420 (and its internal battery) may supply power to accessory 444 connected to display 420.

Data transceiver 474 comprises a device by which data or control signals may be transmitted and received to and from the projection 448 of the attached panel support accessory 444. In one implementation, data transceiver 474 comprises one or more electrically conductive surfaces or contact pads along the exterior surface of projection 448 to facilitate a contact based or wired transmission. In another implementation, data transceiver 454 may comprise an antenna or other mechanism to facilitate wireless communication between display 420 and projection 448 of panel support accessory 444 received within opening 426.

Indicator 478 comprises a device within panel support portion 46 to visibly indicate to a person when one or more of retainer 472, power connection 474 or data transceiver 476 is engaged, connected or communicating with connectors of display 420 within opening 426. For example, in one implementation, indicator 478 may comprise light emitting diodes or other light emitting indicators that inform a person when projection 448 is locked or unlocked with respect to display 420 by retainer 472. Indicator 478 may visibly indicate when projection 448 is appropriately positioned within opening 426 to facilitate power transmission between power connection 454 of display 420 and power connection 474 of projection 448. Indicator 478 may visibly indicate when data or control signals are being transmitted between data transceiver 476 of projection 448 and transceiver 456 of display 420. In other implementations, indicator 478 may indicate the state of additional connections between projection 448 received within opening 426 and display 420, may indicate less than all of the states of retainer 472, power connection 474 and data transceiver 476 or may be omitted.

Controller 480 comprises one or more processing units in panel support portion 46 to generate control signals directing operation of panel supporting accessory 46. Controller 480 is further connected to each of retainer 472, power connection 474, data transceiver 476 and indicator 478. In one implementation, controller 470 generate control signals to actuate retainer 472 between locked and unlocked states. In one implementation, controller 480 controls the transmission or receipt of power through power connection 474. In one implementation, controller 480 controls the transmission or receipt of data or control signals through data transceiver 476. In some implementations, one or more of retainer 472, power connection 474 and data transceiver 476 may alternatively be omitted.

Figure 12:
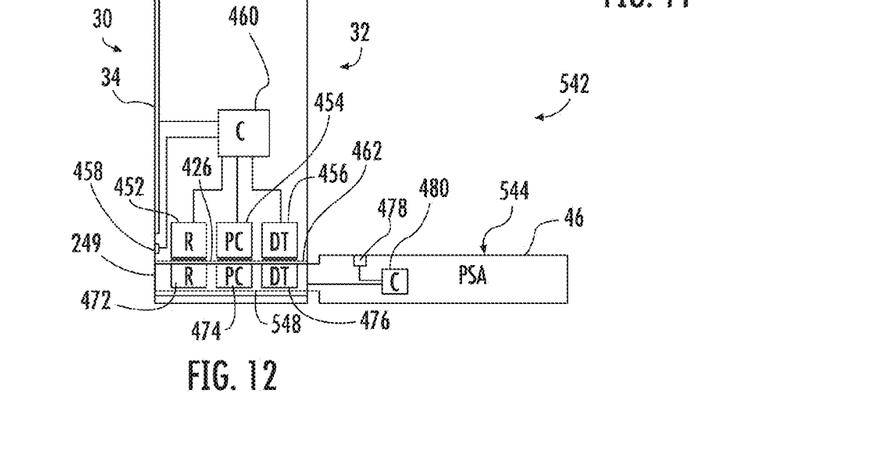
FIG. 12 is a side sectional view of the display of FIG. 9 and provided as part of another example display mounting system.

FIG. 12 illustrates display mounting system 542, an implementation of display mounting system 242. Display mounting system 542 is similar to display mounting system 442 except that display mounting system 542 includes panel support accessory 544 in lieu of panel support accessory 444. Panel support accessory 544 is similar to panel support accessory 444 except that panel support accessory 544 extends along and from rear face 32 of display 420. In particular, panel support accessory 544 comprises panel support portion 46 and projection 548.

Projection 548 is similar to projection 448 except that projection 548 extends from panel support portion 46 into opening 126 of display 120 from the rear face 32. Projection 548 has a terminal end 249 that is flush with front face 30 of display 120. In another implementation, projection 548 may extend beyond rear face 32 or may terminate within opening 126. As with projection 448, projection 548 has outer surfaces that abut, engage or contact the internal or interior surfaces of opening 126 to reliably secure panel support accessory to display 120. As with projection 448, projection 548 comprises accessory retainer 472, power connection 474, data transceiver 476. Projection 548 differs from projection 448 in that the locations of retainer 472, power connection 474 and data transceiver 476 along the length of projection 558 are reversed and projection 558 to facilitate connection of panel support accessory 544 to display 120 from the rear face 32 of display 120.

Figure 13:
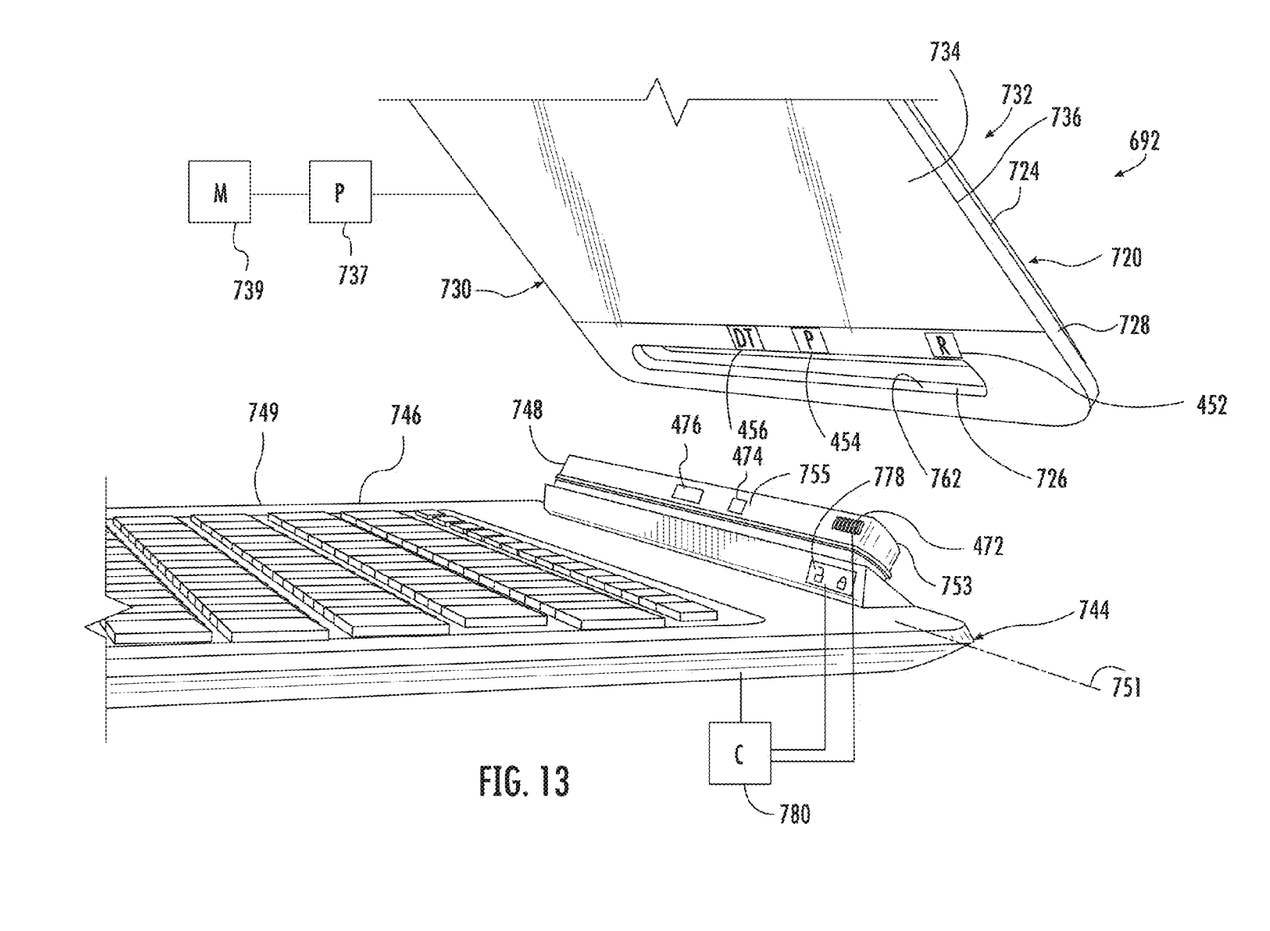
FIG. 13 is a perspective view of another example display mounting system illustrating separation of a display from the panel support accessory.

FIG. 13 illustrates display mounting system 642, an example implementation of mounting system 442. Mounting system 642 comprises display 720 and panel support accessory 744. Display 720 comprises panel 724 and opening 726. Panel 724 comprises a substantially planar panel having a perimeter edge 728 surrounding a front face 730 and a rear face 732. Front face 730 comprises a display region 734. In one implementation, display region 734 comprises a touch screen presenting graphical user interfaces or icons which are selected by a person touching selected portions of display region 734. In other implementations, display region 734 may receive input using other input devices such as a mouse, touchpad, keyboard and the like. In the example illustrated, front face 730 forms a bezel or frame 736 surrounding display region 734. In other implementations, display region 734 may extend substantially across all of front face 730 but for opening 726.

In the example illustrated, display 720 further includes an internal processing device or processing unit 737 and an internal memory 739 (both of which are schematically shown), wherein display 720 serves as a computing tablet. In another implementation, display 720 may utilize a processing device or memory (a source for programming or a source for data) from a remote device or a remote location. For example, in one implementation, display 720 may communicate with a remote location which includes a processing device and/or memory for at least partially controlling or effecting the operation of display 720. In yet another implementation, display 720 may be mounted to a panel support accessory, wherein the panel support accessory comprises a processing device or a memory for at least partially controlling or effecting the operation of display 720. In some implementations, display 720 may be mounted to a panel support accessory which itself is in communication with an external processing unit and/or memory for at least controlling or affecting the operation of display 720.

Opening 726 comprises an aperture, void, receptacle or slot extending into front face 730. Opening 726 is spaced from perimeter edge 728 of display 720. Opening 726 is configured to receive a panel support accessory to facilitate mounting of the panel support accessory to display 720. Examples of different panel supporting assemblies that may be releasably mounted to display 720 using opening 726 include, but are not limited to, a keyboard deck, a power/charge dock, a supporting stand or folio, a keyboard jacket, a battery, a media or connection dock and a wall mount.

In the example illustrated, opening 726 extends completely through display 720, extending from front face 730 to rear face 32. As a result, opening 726 may engage and interact with panel support accessory 744 along the entire thickness of display 720 to facilitate greater contact and greater mechanical support or leverage for the support of display 720 in a vertical or inclined orientation. Moreover, opening 726 may be utilized with panel support accessories connected to display 720 from either the front side of front face 730 or the rear side or rear face 732. In the example illustrated, opening 726 includes internal surfaces 762 facing a centerline of opening 726 (within the thickness of display 720) and along which retainer 452, power connection 454 and data transceiver 456 (described above) are located.

Panel support accessory 746 comprises panel support portion 746 and projection 748. Panel support portion 746 comprises a base that rests upon, abuts against or engages the surrounding environment of display 720 to assist in supporting display 720 in a vertical or inclined orientation with respect to a horizontal surface upon which panel support portion 746 rests. In the example illustrated, panel support portion 746 comprises auxiliary keyboard or keypad, including keys 749 for inputting data or commands. Panel support portion 746 further comprises indicator 778 and controller 780.

Figure 14:
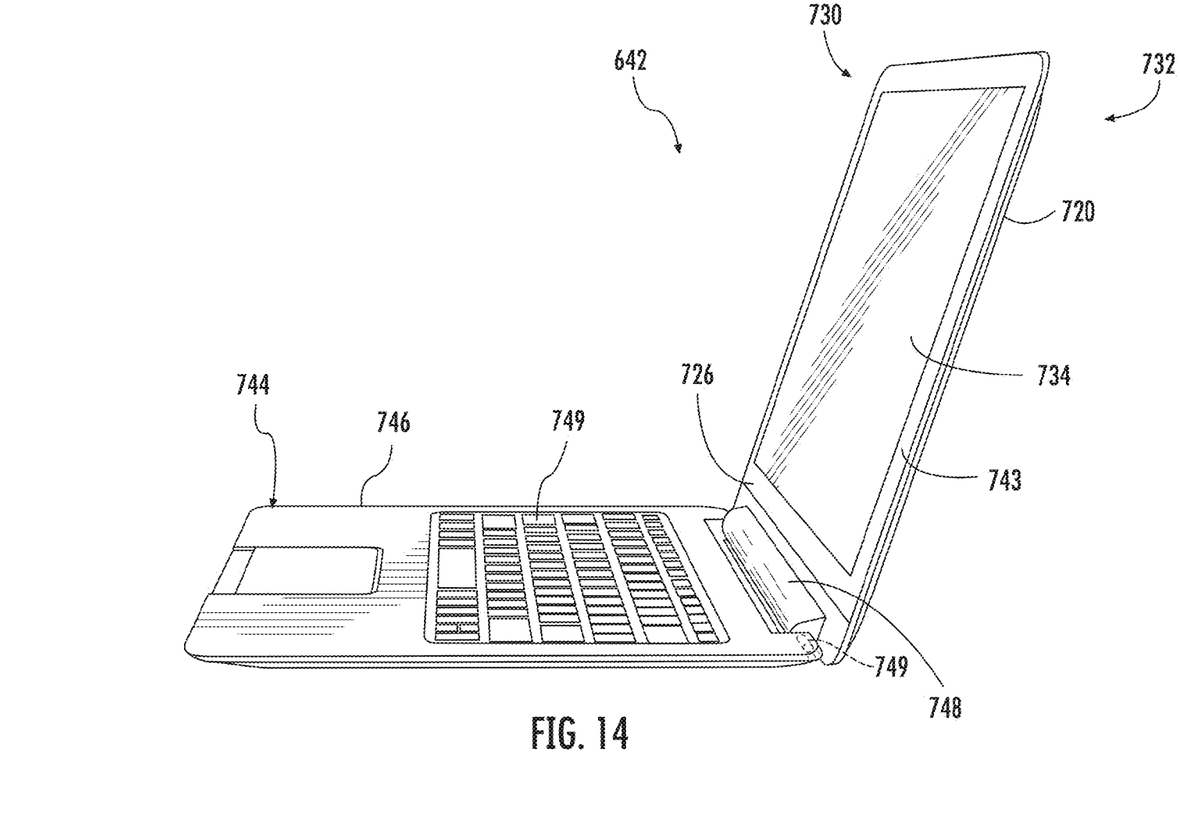
FIG. 14 is a front perspective view of the display mounting system of FIG. 13 illustrating the panel support accessory supporting the display in a first open orientation.
Figure 15:
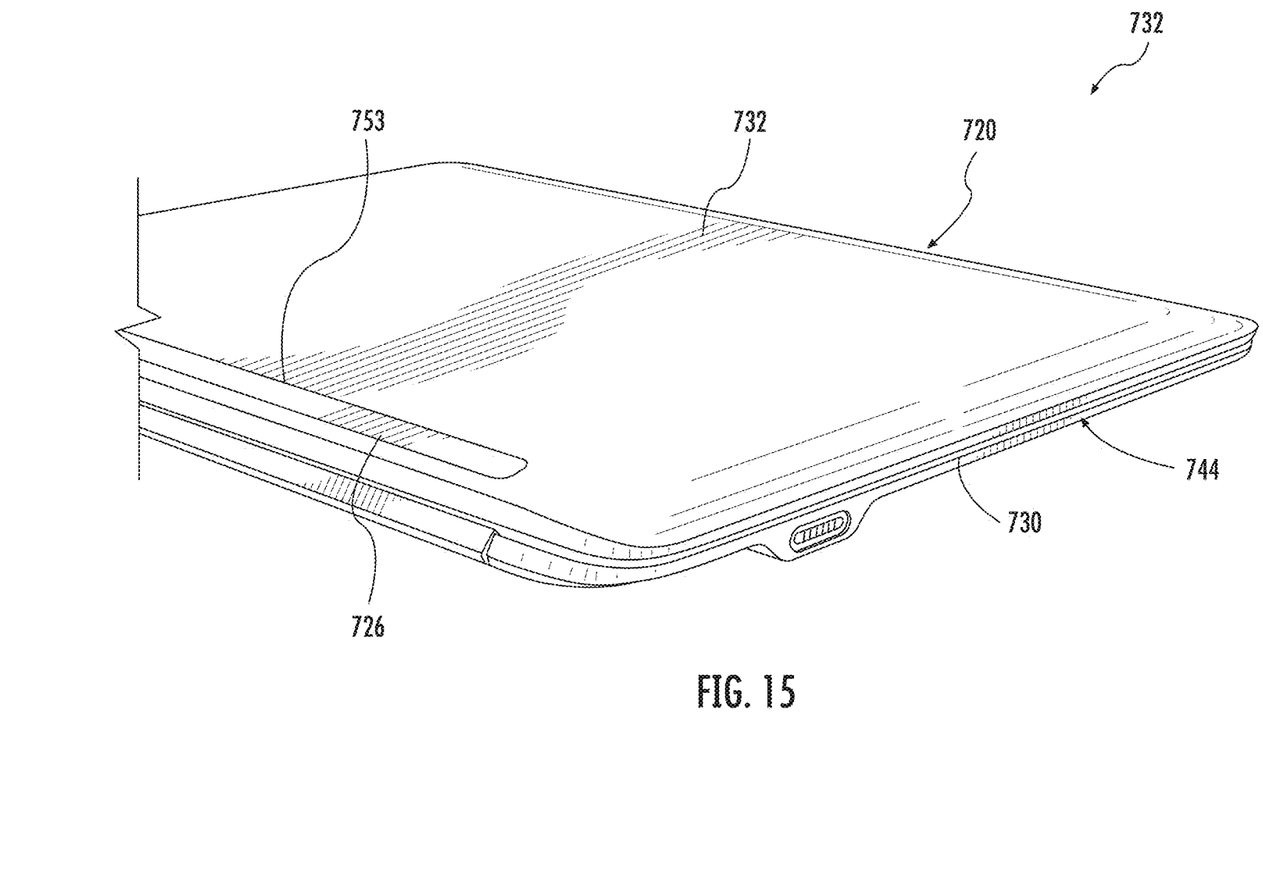
FIG. 15 is a rear perspective view of the display mounting system of FIG. 13 illustrating the panel support accessory supporting the display in a second closed orientation.

Projection 748 extends from panel support portion 746. In the example illustrated, projection 748 is pivotably coupled to panel support portion 746 about a hinge 749 (shown in FIG. 14) between projection 748 and panel support portion 746 for pivotal movement about a horizontal axis 751 to adjust the verticality or tilted orientation of display 720. For example, FIG. 14 illustrates projection 748 supporting display 720 in an inclined orientation with respect to panel support accessory 746. FIG. 15 illustrates projection 748 connected to display 720 and supporting display 720 in a closed position in which display 720 extends over keys 749 (shown in FIG. 14) with display region 743 facing keys 749. As a result, projection 748 cooperates with display 720 to form a notebook.

In the example illustrated, projection 148 has a length so as to extend across or through the entire thickness of display 720. In one implementation, projection 748 terminates at an end face 753 that is flush with rear face 732 of display 720. In another implementation, projection 748 may extend beyond rear face 32 or may terminate within opening 726. Projection 748 has outer surfaces 755 that abut, engage or contact the internal or interior surfaces 762 of opening 726 to reliably secure panel support accessory to display 720. Similar to projection 448, projection 748 further comprises accessory retainer 472, accessory power connection 474, accessory data transceiver 476.

Indicator 778 comprises a device within panel support portion 746 to visibly indicate to a person when retainer 472 is engaged or connected to retainer 452 within opening 726. In the example illustrated, indicator 778 comprises light emitting diodes or other light emitting indicators that inform a person when projection 726 is locked or unlocked with respect to display 720 by retainer 472. In other implementations, indicator 778 may indicate the state of additional connections between projection 748 received within opening 726 and display 420 or may be omitted.

Controller 480 comprises one or more processing units in panel support portion 746 to generate control signals directing operation of panel supporting accessory 746. Controller 780 is further connected to retainer 472. In one implementation, controller 480 generates control signals to actuate retainer 472 between locked and unlocked states. In other implementations, the locking and unlocking baby achieved through one or more manual locking mechanisms or actuators.

Figures 16, 17:
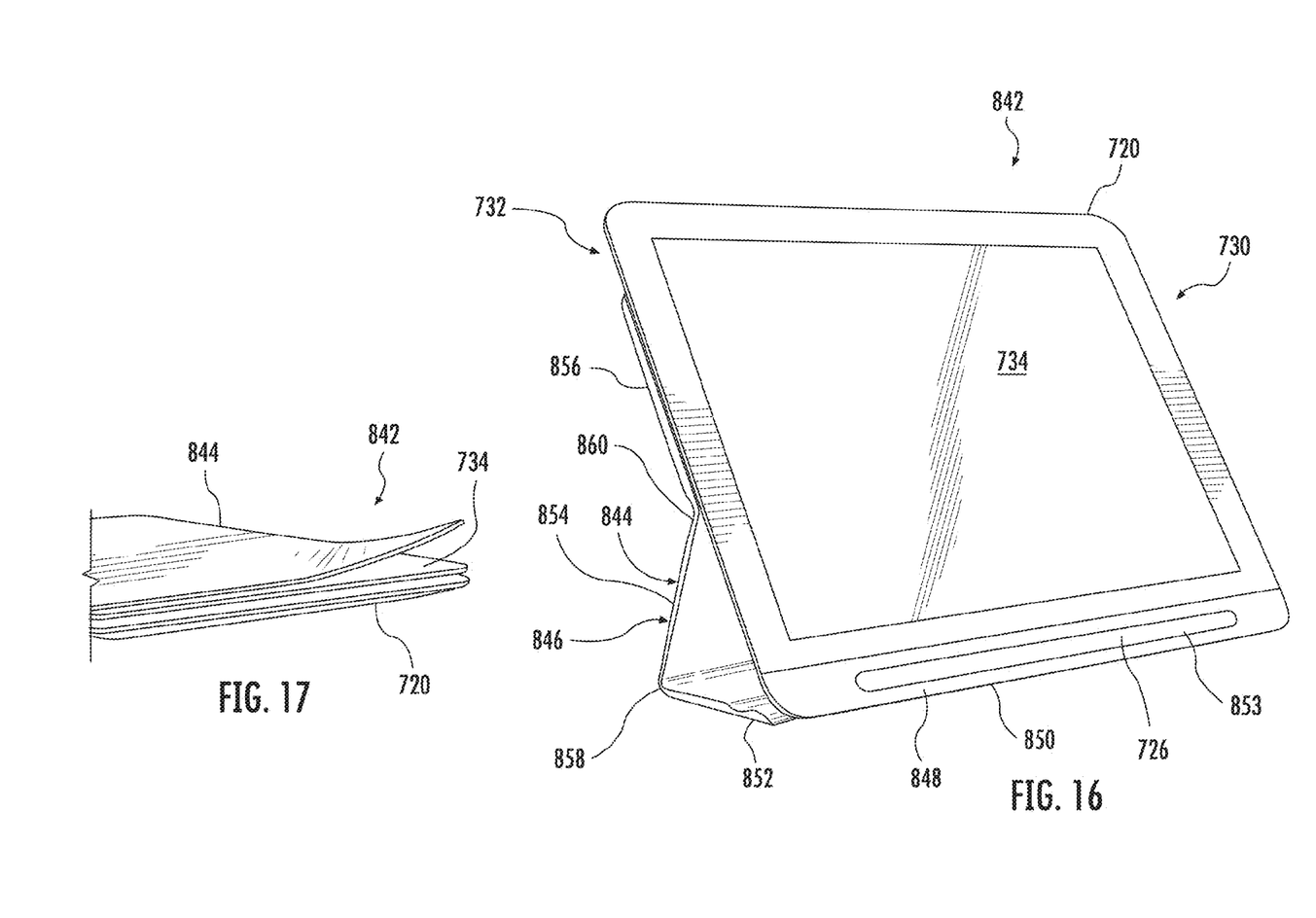
FIG. 16 is a front perspective view of another example display mounting system utilizing the display of FIG. 13, wherein a panel support accessory is supporting the display in an upright orientation.
FIG. 17 the front perspective view of the display mounting system of FIG. 16 illustrating the panel support accessory covering a display region of the display.

FIG. 16 illustrates display 720 incorporated as part of another display mounting system 842. In addition to display 720, mounting system 842 comprises panel support accessory 844 in the form of a folio cover or folio. Accessory 844 comprises panel support portion 846 and projection 848.

Panel support portion 846 comprises a cover formed from panels 850, 852, 854 and 856 which facilitate use of the cover is a stand for supporting display 20 in an inclined orientation as shown in FIG. 16. In such an orientation, panel 850 extends along and parallel to the rear face 32 of display 20 and is hinged to panel 852. Panel 852 extends along a flat underlying support surface to serve as a base. Panel 854 is pivotally connected to panel 852 about a living hinge 858 and extends upwardly. Panel 856 is pivotally connected to panel 854 about a living hinge 860 and it is releasably connected to the rear face 32 of display 720. When used as a cover as shown in FIG. 17, panels 852, 854 and 856 pivot relative to panel 850 so as to extend along front face 730 of display 720 to extend across display screen 734 to protect display screen 734.

Projection 848 extends from panel 850 and projects through opening 726 from rear face 32. In the example illustrated, projection 848 has an end surface 853 that since substantially flush with the surface of front face 730 of display 720. Because projection 848 extends completely through opening 726 and has a shape corresponding to the shape of opening 726 so as to key or mate with the interior sides of opening 726, accessory 844 is reliably secured to display 720 without increasing the thickness of display 720.

Figure 18:
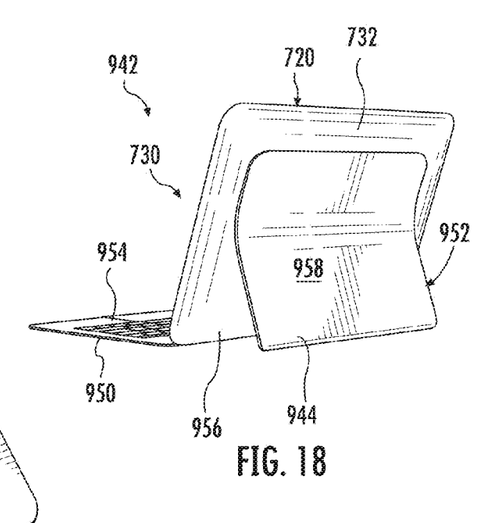
FIG. 18 is a rear perspective view of another example display mounting system utilizing the display of FIG. 13, wherein a panel support accessory is supporting the display in an upright orientation.
Figure 19:
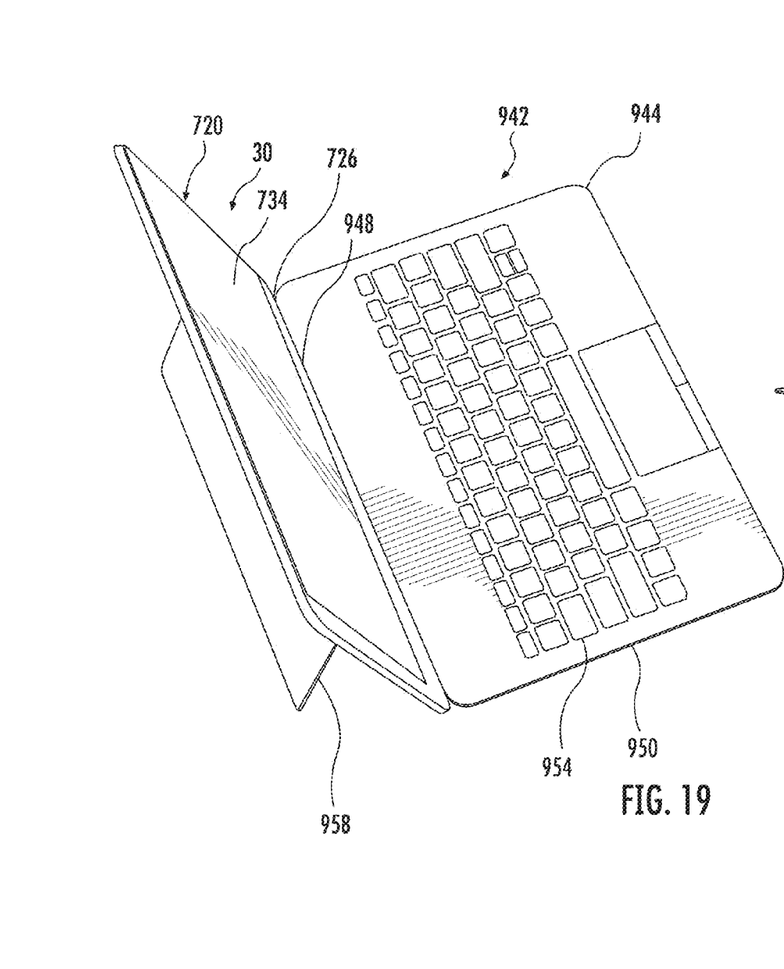
FIG. 19 is another perspective view of the display mounting system of FIG. 18.

FIGS. 18 and 19 illustrate display 720 incorporated as part of another display mounting system 942. In addition to display 720, mounting system 942 comprises panel support accessory 944 in the form of soft keyboard and stand. Accessory 844 comprises panel support portion 946 and projection 948.

Panel support portion 946 supports display 720 in an upright, somewhat tilted orientation with respect to an underlying surface. Panel support portion 946 comprises keyboard 950 and backing 952. Keyboard 950 comprise a soft keyboard extending from front face 30 of display 720. Keyboard 950 is connected to backing 952 beneath a lower edge of display 720.

Backing 952 extends from keyboard 950 and supports display 720 in the upright orientation. Backing 952 comprises base portion 956 and support 958. Base 956 is connected to keyboard 950 and extends along the underlying support surface. Based upon 956 further includes an upwardly extending portion from which projection 948 extends. Support 958 comprises a wall or other structure angling forwardly into engagement with rear face 732 of display 720 to support display 720.

Projection 948 extends from panel 850 and projects through opening 726 from rear face 32. In the example illustrated, projection 848 has an end surface 853 that since substantially flush with the surface of front face 730 of display 720. Because projection 848 extends completely through opening 726 and has a shape corresponding to the shape of opening 726 so as to key or mate with the interior sides of opening 726, accessory 844 is reliably secured to display 720 without increasing the thickness of display 720.

In one implementation, projection 848 further facilitates data and/or power communication between keyboard 950 and display 720. In one implementation, keyboard 950 may include extra battery capacity, wherein projection 848 additionally comprises power connector 474 (described above) for transmitting power to display 720 through power connector 454. In one implementation, communication between keypad 950 and display 720 may be achieved utilizing a data transceiver 476 and projection 848 which interacts with data transceiver 456 in opening 726 of display 720.

Figures 20, 21:
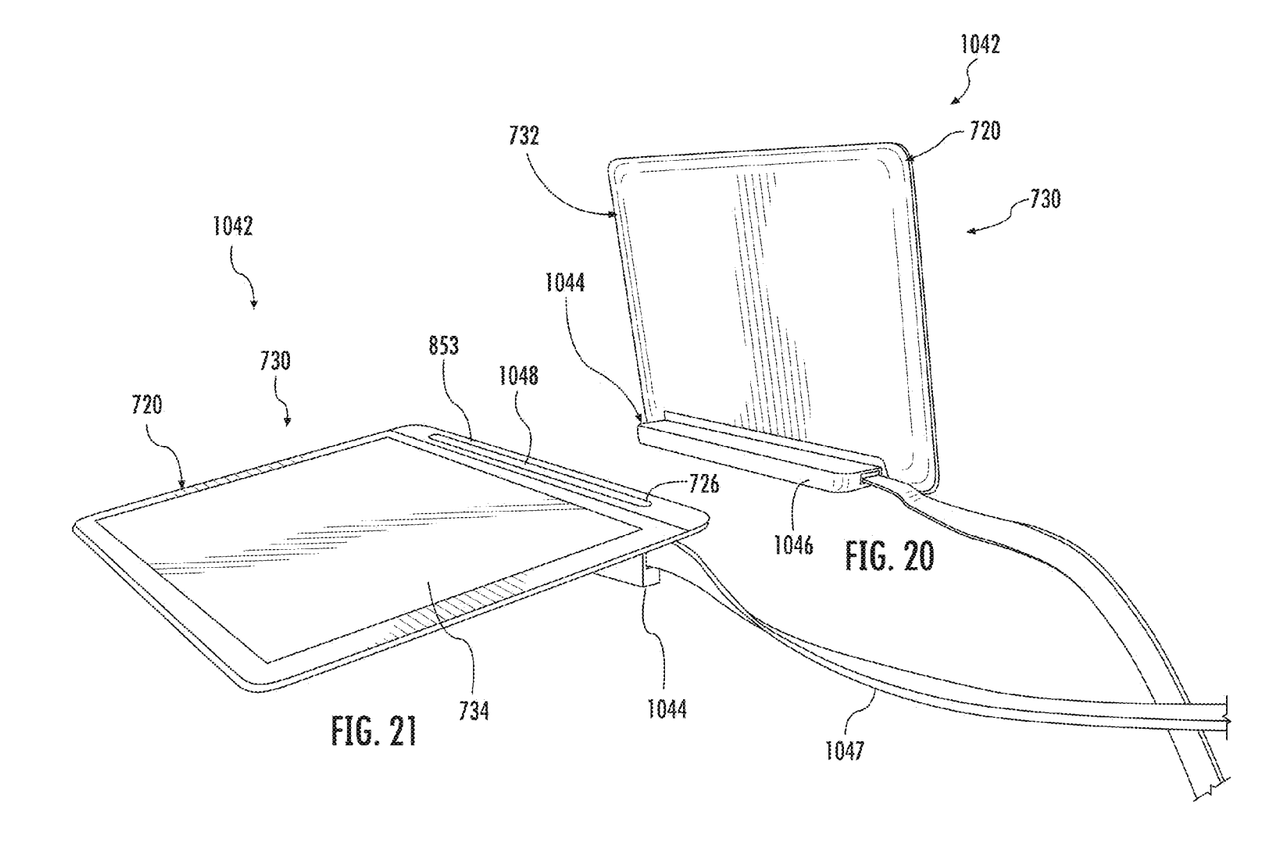
FIG. 20 is a rear perspective view of another example display mounting system utilizing the display of FIG. 13, wherein a panel support accessory supports the display in a first upright orientation.
FIG. 21 is a front perspective view of the display mounting system of FIG. 20 wherein the display support accessory supports the display in a second tilted orientation.

FIGS. 20 and 21 illustrate display 720 incorporated as part of another display mounting system 1042. In addition to display 720, mounting system 1042 comprises panel support accessory 1044 in the form of an AC charging stand. Accessory 1044 comprises panel support portion 1046 and projection 1048. Panel support portion 1046 comprises an AC-to-DC power converter or power supply having an attached cord 1047 for being plugged to into an AC power source.

Projection 1048 extends from panel support portion 1046 and projects through opening 726 from rear face 32. In the example illustrated, projection 848 has an end surface 853 that extends substantially flush with the surface of front face 730 of display 720. Because projection 848 extends completely through opening 726 and has a shape corresponding to the shape of opening 726 so as to key or mate with the interior sides of opening 726, accessory 1044 is reliably secured to display 720 without increasing the thickness of display 720. Projection 848 comprises power connection 474 (described above) along its exterior outward surfaces that face the interior surfaces 762 of opening 726. Power connection 724 cooperates with power connection 454 to transmit direct-current political power from panel support portion 1046 to display 720.

In addition to supplying power to display 720, panel support portion 1046 serves as a stand to support display 720 in a tilted a vertical orientation in which panel 720 extends upwardly from opening 726 as shown in FIG. 20 or a downwardly tilted orientation in which panel 720 extends or slopes downwardly from opening 726 as shown in FIG. 21.

Figure 22:
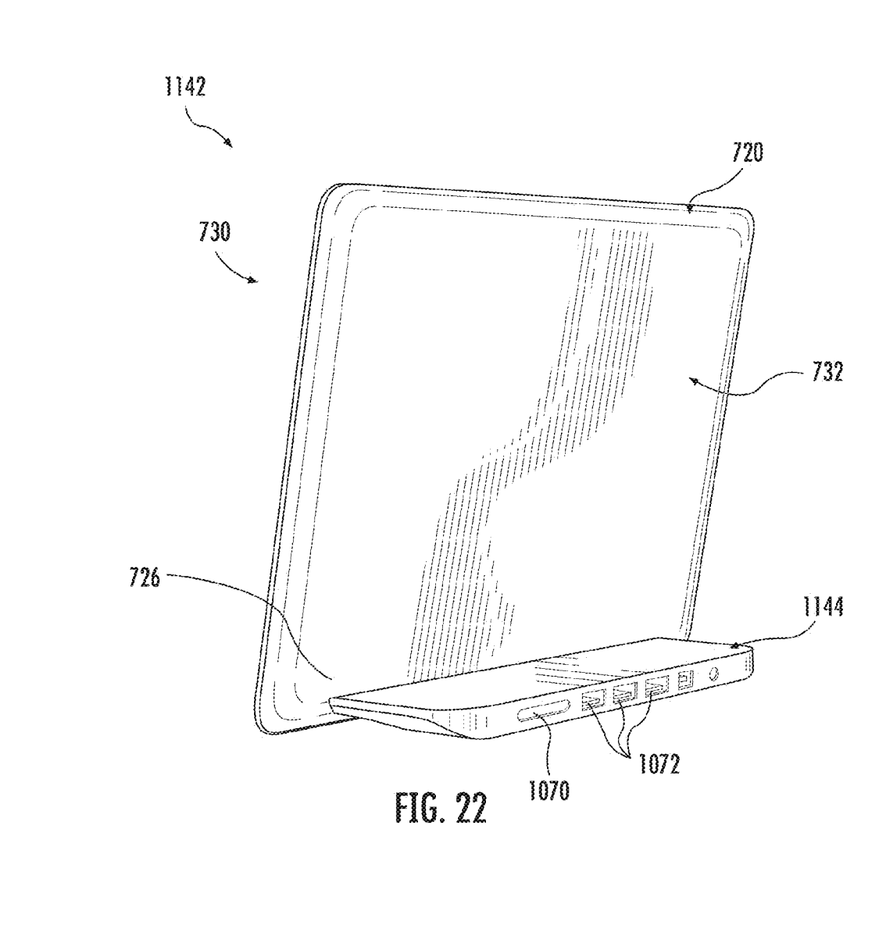
FIG. 22 to the rear perspective view of another example display mounting system utilizing the display of FIG. 13.

FIG. 22 illustrates display 720 incorporated as part of another display mounting system 1142. In addition to display 720, mounting system 1142 comprises panel support accessory 1144 in the form of a media stand or media dock. Accessory 1144 comprises panel support portion 1146 and projection 1148. Panel support portion 1146 comprises a media dock having a plurality of external media ports, such as ports 1070 and 1072. In the example illustrated, port 1070 comprises a flash memory slot. Ports 1072 comprise universal serial bus (USB) ports. In other implementations, panel support portion 146 may include other types of ports for facilitating the plugging of panel support portion 1146 (and display 720) to other forms of media such as flash memory or to cabling connects to other media or memory devices. In addition to providing additional data or signal communication ports for display 720, panel support portion 1046 serves as a stand to support display 720 in a vertical upright orientation.

Projection 1048 extends from panel support portion 1046 and projects through opening 726 from rear face 32. In the example illustrated, projection 848 has an end surface 853 that since substantially flush with the surface of front face 730 of display 720. Because projection 848 extends completely through opening 726 and has a shape corresponding to the shape of opening 726 so as to key or mate with the interior sides of opening 726, accessory 1044 is reliably secured to display 720 without increasing the thickness of display 720. In the example illustrated, projection 1048 further comprises data transceiver 476 (described above) along its exterior outward surfaces that face the interior surfaces 762 of opening 726. Data transceiver 476 cooperates with data transceiver 456 of display 720 (shown FIG. 13) to transmit data or control signals across ports 1070, 1072 of panel support portion 1046 to and from display 720.

Figures 23, 24:
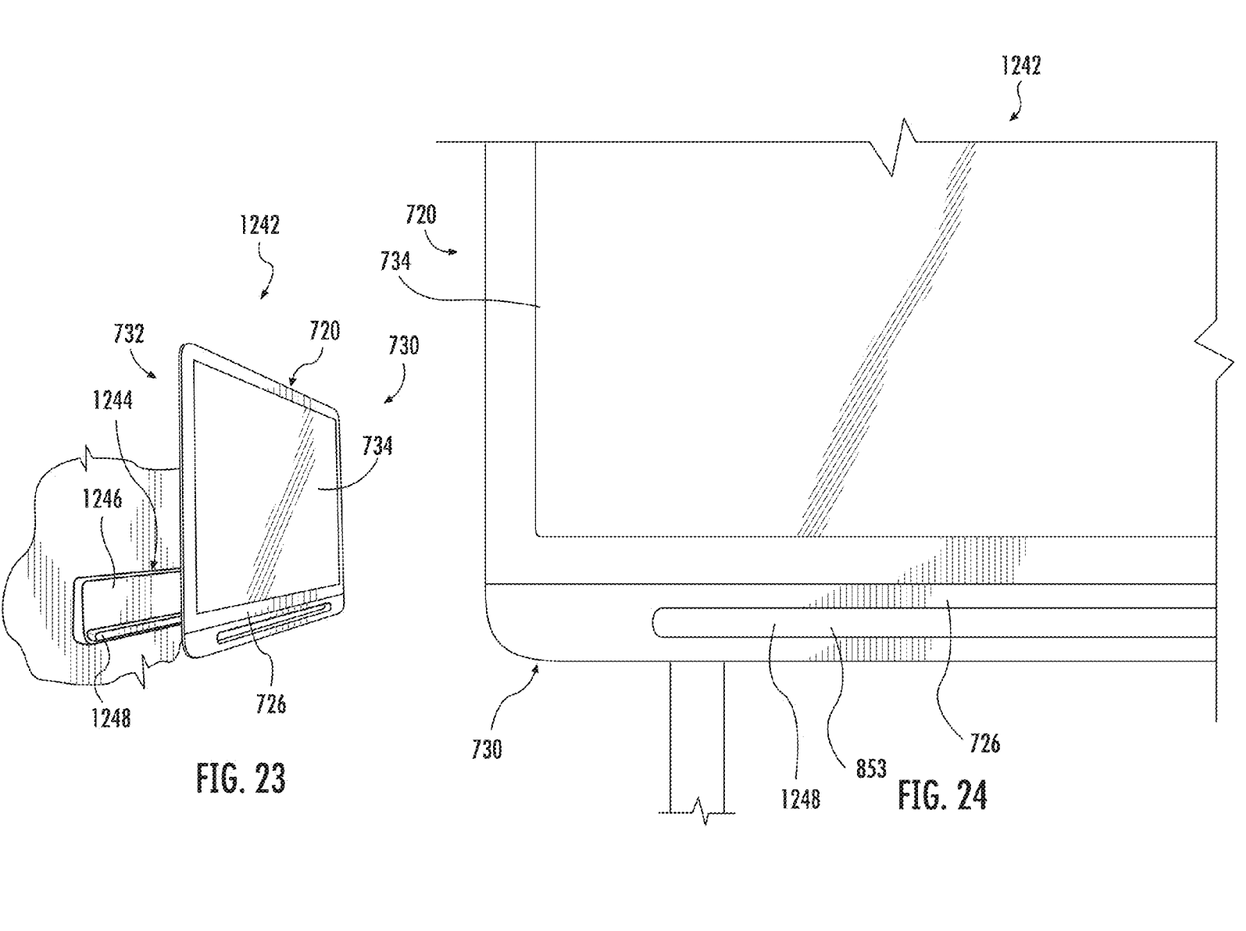
FIG. 23 is a front perspective view of another example display mounting system utilizing the display of FIG. 13, wherein the display is illustrated as being separated from a display support accessory.
FIG. 24 is a front view of the display mounting system of FIG. 23 with the display joined to the display support accessory.

FIGS. 23 and 24 illustrate display 720 incorporated as part of another display mounting system 1242. In addition to display 720, mounting system 1242 comprises panel support accessory 1244 in the form of a wall mount. FIG. 23 is an exploded view illustrating display 720 prior to be mounted to panel support accessory 1244. FIG. 23 illustrates display 720 mounted to panel support accessory 1244.

Accessory 1244 comprises panel support portion 1246 and projection 1248. Panel support portion 1246 comprises a structure configured to be mounted to a vertical wall or vertical panel so as to support and cantilever display 720 with respect to the vertical wall or panel. For example, in one implementation, panel support portion 1246 may include fasteners or other anchors to secure panel support portion 1146 to the vertical panel or vertical wall.

Projection 1248 extends from panel support portion 1246 and projects through opening 726 from rear face 32. In the example illustrated, projection 1248 has an end surface 853 that extends substantially flush with the surface of front face 730 of display 720. Because projection 1148 extends completely through opening 726 and has a shape corresponding to the shape of opening 726 so as to key or mate with the interior sides of opening 726, accessory 1244 is reliably secured to display 720 without increasing the thickness of display 720.

In one implementation, projection 1248 rigidly and stationarily extends from panel support portion 1246 such that the orientation of display 720 relative to the vertical wall is fixed. In one implementation, projection 1248 is configured to support display 720 in a plane parallel to the plane of the vertical wall to which panel support portion 1246 is mounted. In another implementation, projection 1248 may be pivotably connected to panel support portion 1246 (in a fashion similar to projection 748), wherein projection 1248 may be pivoted to and retained in a selected one of a plurality of different angular positions relative to panel support portion 1246 and relative to the vertical wall or panel to which panel support portion 1246 is mounted.

In one implementation, in addition to supporting display 720 along a vertical wall or panel, panel support accessory 1244 may also provide one or more of data or power to display 720. For example, in one implementation, projection 1248 may comprise power connection 474 (described above) for interacting with power connection 454 of display 720 to transmit power to display 720. In such an implementation, panel support portion 1246 may additionally comprise: (1) an internal chamber for containing a battery that is electrically connected to power connection 474 or (2) an AC to DC power converter that is electrically connected between power connection 474 and a wall AC power source or another remote power source.

In one implementation, projection 1248 may additionally or alternatively comprise data transceiver 476 to cooperate with data transceiver 456 of display 720 to facilitate transmission of data or control signals between display 720 and panel support portion 1246. In such an implementation, panel support portion 1246 may additionally comprise cabling for connection to the remote source for data or control signals. Panel support portion 1246 may additionally or alternatively comprise media ports for either the reception of portable memory devices, such as flash memory cards, or for media cable plugs such as USB (and its progeny), high definition multimedia interface HDMI or other media cabling/interfaces or transferring data signals.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A tablet mounting system comprising:
    a display comprising a perimeter edge surrounding a front face comprising a display region and a rear face; and
    an opening extending into the front face and spaced from the perimeter edge of the display to receive and facilitate mounting of a display support accessory, wherein the opening extends through the display from the front face to the rear face, and wherein the opening is configured to receive and facilitate mounting of the display support accessory on a front side of the display, wherein the display support accessory comprises a mounting projection and is located on a first side of the display with the mounting projection extending from the first side of the display through the opening to a second side of the display and wherein the mounting projection is flush with the second side of the display.

2. The system of claim 1 further comprising a retainer along an interior surface of the opening to releasably retain the display support accessory within the opening.

3. The system of claim 2 further comprising a power connection along the interior surface of the opening to receive power from the display support accessory within the opening.

4. The system of claim 3 further comprising a data transceiver along the interior surface of the opening to transmit and receive data signals to and from the display support accessory.

5. The system of claim 1 further comprising a power connection along the interior surface of the opening to receive power from the display support accessory within the opening.

6. The system of claim 1 further comprising a data transceiver along the interior surface of the opening to transmit and receive data signals to and from the display support accessory.

7. The system of claim 1 further comprising the display support accessory, wherein the accessory comprises:
    a projection received within the opening; and
    a hinge coupled to the projection.

8. The system of claim 1, with opening comprises an elongate slot between the display region and the perimeter edge proximate a bottom of the display region.

9. The system of claim 1 further comprising the display support accessory received within the opening, the display support accessory selected from a group of accessories consisting of: a keyboard deck; a power/charge dock; a stand and a wall mount.

10. A display support accessory for use with a display having a perimeter edge surrounding a front face comprising a display region and a rear face and an opening extending into the front face and spaced from the perimeter edge of the display, the display support accessory comprising:
    a panel support portion to bear against and support the display with respect to a flat planar surface;
    a projection extending from the panel support portion to extend through the opening of the display; and
    a hinge to couple the projection to the panel support portion.

* * * * *